(12) United States Patent
Bouzmane

(10) Patent No.: US 10,577,087 B2
(45) Date of Patent: Mar. 3, 2020

(54) ELECTRIC HYDRAULIC MOTOR SYSTEM FOR AIRCRAFT

(71) Applicant: Mohammed Bouzmane, Columbus, OH (US)

(72) Inventor: Mohammed Bouzmane, Columbus, OH (US)

(*) Notice: Subject to any disclaimer, the term of this patent is extended or adjusted under 35 U.S.C. 154(b) by 245 days.

(21) Appl. No.: 15/485,602

(22) Filed: Apr. 12, 2017

(65) Prior Publication Data

US 2017/0217573 A1     Aug. 3, 2017

Related U.S. Application Data

(63) Continuation-in-part of application No. 14/662,052, filed on Mar. 18, 2015, now Pat. No. 9,650,130.

(51) Int. Cl.
*B64C 25/40*     (2006.01)
*B60L 7/10*     (2006.01)
*B64D 27/24*     (2006.01)
*B60L 53/12*     (2019.01)

(52) U.S. Cl.
CPC ............. *B64C 25/405* (2013.01); *B60L 7/10* (2013.01); *B60L 53/12* (2019.02); *B64D 27/24* (2013.01); *Y02T 50/823* (2013.01)

(58) Field of Classification Search
CPC .............................. B64C 25/405; B64D 41/00
See application file for complete search history.

(56) References Cited

U.S. PATENT DOCUMENTS

| | | | |
|---|---|---|---|
| 9,016,620 B2* | 4/2015 | Wilson | B64C 25/405 244/100 R |
| 9,242,726 B2* | 1/2016 | Garcia | B64C 25/405 |
| 2013/0214089 A1* | 8/2013 | Cox | B64C 25/405 244/50 |
| 2016/0318604 A1* | 11/2016 | Guery | B64C 25/36 |

* cited by examiner

*Primary Examiner* — J. Woodrow Eldred
(74) *Attorney, Agent, or Firm* — Miracle IP; Bryce D. Miracle

(57) ABSTRACT

An electric hydraulic motor system for aircraft having at least a taxing and takeoff mode. While in the taxiing and takeoff mode, a battery and optionally other sources of energy stored within the aircraft together provide energy to drive an electric motor, which in turn drives a hydraulic pump creating hydraulic pressure within the aircraft hydraulic system. The increase in hydraulic pressure within the system actuates a hydraulic motor connected to the aircraft wheels, thereby providing rotation to the wheels of the aircraft, moving the aircraft forward.

1 Claim, 4 Drawing Sheets

TAXI AND TAKEOFF MODE

LANDING AND BRAKING MODE

ELECTRIC HYDRAULIC MOTOR SYSTEM FOR AIRCRAFT

This application is a continuation-in-part of the previously filed, copending U.S. patent application entitled "ELECTRIC HYDRAULIC MOTOR SYSTEM FOR AIRCRAFT" filed Sep. 24, 2015, application Ser. No. 14/662,052, the entire disclosure of which is hereby incorporated herein by reference.

BACKGROUND

The present invention pertains to an electric hydraulic motor system for providing forward, backward movement and braking during taxiing of an aircraft, take-off and landing—replacing the need for aircraft engines for propulsion.

Aircraft taxiing is the movement of an aircraft on the ground, under its own power, in contrast to towing or push-back where the aircraft is moved by a tug. The aircraft usually moves on wheels, but the term also includes aircraft which may utilize skis or floats for water based travel.

Normally, the thrust to propel the aircraft forward comes from its propellers or jet engines. Typical aircraft can spend a significant amount of time taxiing requiring a significant amount of fuel which may cause high levels of emissions and noise pollution.

The present invention provides a system for reducing these problems. The difficulties inherent in the art are therefore overcome in a way which is simple, useful, and efficient—which will provide better and more advantageous results by reducing aircraft fuel consumption, emissions, and noise pollution.

SUMMARY

For the foregoing reasons, what is needed is an electric hydraulic motor system for providing braking and propulsion to an aircraft without the assistance of the aircraft primary engine.

In a version of the invention, the aircraft system comprises an electric hydraulic motor system for aircraft having wheels, comprising: (a) a source of power; (b) an electric motor operatively connected to the source of power of the aircraft; (c) a hydraulic system of the aircraft; (d) a hydraulic pump operatively connected to each the electric motor and the hydraulic system of the aircraft; and (e) a hydraulic motor operatively connected to each wheel of the aircraft and the hydraulic system of the aircraft; and wherein while in taxiing and takeoff mode the source of power of the aircraft provide electricity to drive the electric motor, which drives the hydraulic pump, which creates hydraulic pressure within the hydraulic system to actuate the hydraulic motors in order to drive the wheels of the aircraft.

In another version of the invention, the aircraft system comprises a battery; an electric motor and an electric generator, both the electric motor and the electric generator are operatively connected to the battery of the aircraft. The version futher comprises a hydraulic system of the aircraft; a first hydraulic pump operatively connected to each the electric motor and the hydraulic system of the aircraft; and a first hydraulic motor operatively connected to each wheel of the aircraft and the hydraulic system of the aircraft. A second hydraulic motor is provided and operatively connects to each the electric generator and the hydraulic system of the aircraft; and a second hydraulic pump is provided operatively connected to each wheel of the aircraft and the hydraulic system of the aircraft.

The version has two modes of operation—the first a taxiing and takeoff mode wherein while in taxiing and takeoff mode, the battery storage of the aircraft provides electricity to drive the electric motor, which drives the hydraulic pump, which creates hydraulic pressure to actuate the first hydraulic motor in order to drive the wheels of the aircraft.

The second mode of operation is a braking mode—wherein while in braking mode the rotation of the wheels of the aircraft drive the second hydraulic pump which supplies hydraulic pressure to the aircraft hydraulic system.

In another version of the invention, the electric hydraulic motor system further utilizes a hydrogen fuel cell in order to provide a source of energy. The electric motor is operatively connected to the battery and hydrogen fuel cell of the aircraft. In the version, while in taxiing and takeoff mode, the battery storage and hydrogen fuel cells provide electricity to drive the electric motor which drives the hydraulic pump which creates hydraulic pressure to actuate the first hydraulic motor in order to drive the wheels of the aircraft.

In yet another version, the electric hydraulic motor system further utilizes a wireless power transfer system for providing battery charge throughout landing, takeoff, taxiing, and parking.

In other versions of the invention suited for heavy aircraft, an auxiliary power unit can be utilized in conjunction with the battery and/or hydrogen fuel cell in combination in order to provide electricity to the electric hydraulic motor system. Moreover, the auxiliary power unit can be configured to charge the aircraft battery and directly provide hydraulic pressure to the hydraulic system of the aircraft.

The electric hydraulic motor system can be configured to carry out both modes of operation or configured to provide only one of the modes of operation.

Still other benefits and advantages of the invention will become apparent to those skilled in the art to which it pertains upon a reading and understanding of the following detailed specification.

BRIEF DESCRIPTION OF THE DRAWINGS

These and other features, aspects, and advantages of the present invention will become better understood with regard to the following description, appended claims, and accompanying drawings where:

DESCRIPTION

Figure 1:
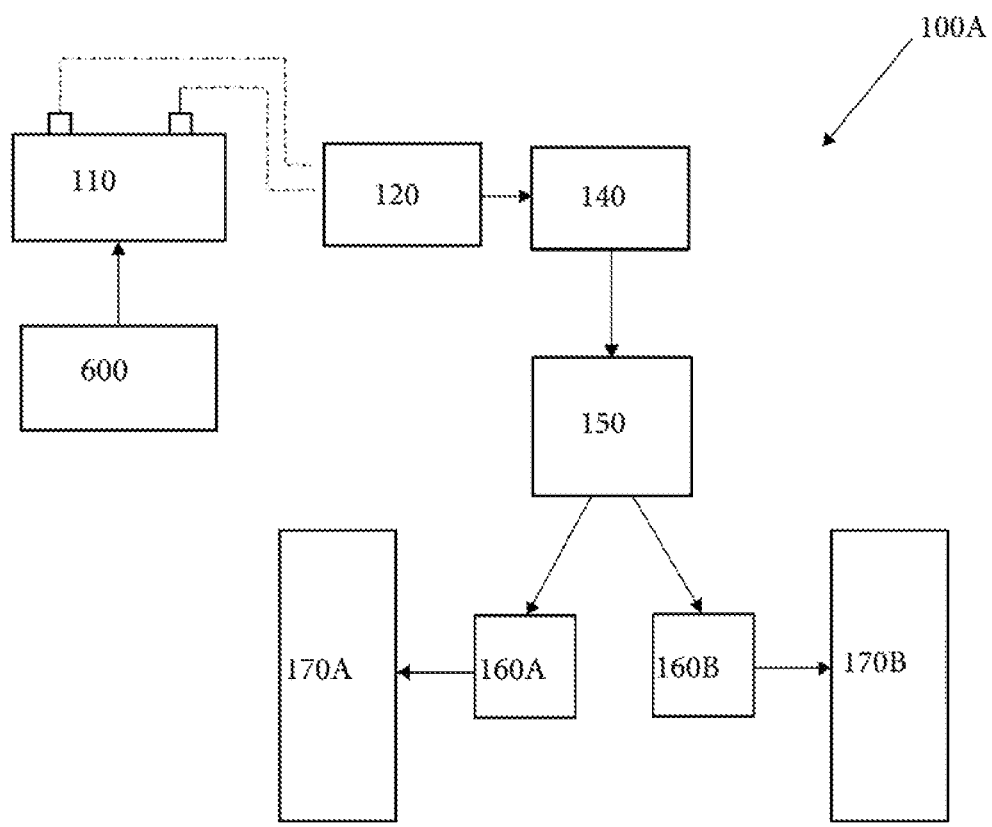
FIG. 1 is a schematic view of a version of the system of the present invention while in the taxiing and takeoff mode.

Referring now to the drawings wherein the showings are only for purposes of illustrating a preferred version of the invention and not for purposes of limiting the same.

The following detailed description is of the best currently contemplated modes of carrying out exemplary versions of the invention. The description is not to be taken in the limiting sense, but is made merely for the purpose of illustrating the general principles of the invention, since the scope of the invention is best defined by the appended claims.

Various inventive features are described below that can each be used independently of one another or in combination with other features.

Figure 2:
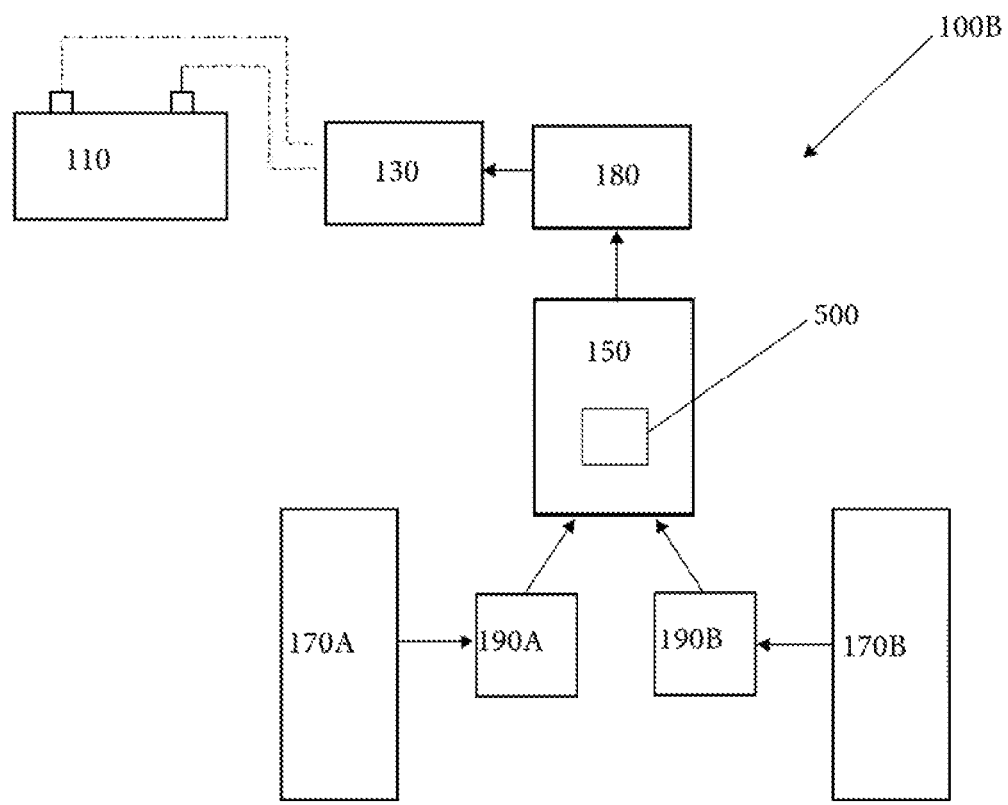
FIG. 2 is a schematic view of a version of the system of the present invention while in the landing and braking mode.

With reference now to FIG. 1 and FIG. 2, a new electric hydraulic motor system for aircraft is provided which embodies the concepts of the present invention and generally designated by the reference numeral 100A (taxi and takeoff mode) and 100B (braking and landing mode).

FIG. 1 and FIG. 2 are schematic views of the system while in the taxiing and takeoff mode and the braking mode respectively. The system comprises a battery 110, an electric motor 120 and an electric generator 130, both the electric motor 120 and the electric generator 130 are operatively connected to the battery 110 of the aircraft. The system includes a hydraulic system 150 of the aircraft as currently known in the art relating to hydraulic machinery and a first hydraulic pump 140. The first hydraulic pump 140 is operatively connected to each the electric motor 120 and the hydraulic system 150 of the aircraft. A first hydraulic motor 160A and 160B is provided which is operatively connected to each corresponding wheel 170A and 170B of the aircraft and the hydraulic system 150 of the aircraft. A second hydraulic motor 180 is provided that is operatively connected to each the electric generator 130 and the hydraulic system 150 of the aircraft. Wheel driven second hydraulic pumps 190A and 190B are operatively connected to the wheels 170A and 170B of the aircraft and the hydraulic system 150.

The version 100 has two modes of operation—the first a taxiing and takeoff mode 100A as depicted by FIG. 1 and a landing and braking mode 100B as depicted by FIG. 2. While in taxiing and takeoff mode, the version 100A provides forward and backward movement and braking, replacing the need for the aircraft to operate with the engines powered on. In particular, during the taxiing and takeoff mode, the electric hydraulic motor system 100A provides rotation of the aircraft wheels 170A and 170B, imparting movement of the aircraft. In particular, the battery 110 provides electricity to drive the electric motor 120, which drives the hydraulic pump 140, which increases hydraulic pressure within the hydraulic system 150. The increase in hydraulic pressure is applied to actuate each first hydraulic motor 160A and 160B which creates a torque action, driving the corresponding wheels 170A and 170B of the aircraft. The system 100A works while the aircraft wheels are in contact with the ground throughout landing, taxiing, and takeoff. Moreover, while in takeoff, the system 100A may provide additional forward momentum in aggregate with the aircraft engines to the aircraft in order to reduce the amount distance to take off.

The second mode of operation is the landing and braking mode 100B which is depicted by FIG. 2. During the landing and braking mode, the electric hydraulic motor system imparts a braking action to the aircraft while simultaneously providing hydraulic pressure to the hydraulic system 150, which may be configured to charge the aircraft battery 110.

Preferably, the battery 110 is a chargeable battery storage as known in the art of batteries. A single battery unit can be utilized or a series of multiple batteries can be utilized for storage and a source of power. In particular, the wheels 170A and 170B of the aircraft, drive the wheel driven second hydraulic pumps 190A and 190B which creates hydraulic pressure within the hydraulic system 150 to drive the second hydraulic motor 180, which drives the electric generator 130, which simultaneously slows the aircraft and charges the battery 110. Thus, the system 100B utilizes regenerative braking in order to provide hydraulic pressure to the hydraulic system 150, charging the battery 110 while simultaneously reducing the speed of the aircraft throughout the landing roll.

The system 100 can be configured to carry out both modes of operation or configured to provide only one of the modes of operation as described above.

As depicted in FIG. 2, the electric hydraulic motor system may also include a hydraulic accumulator 500. The hydraulic accumulator 500 stores hydraulic pressure created by the hydraulic pumps 190A and 190B during landing to enable the hydraulic system 150 to effectively store the increased energy associated with an abrupt rotation of the wheels 170A and 170B of the aircraft during landing.

Figure 3:
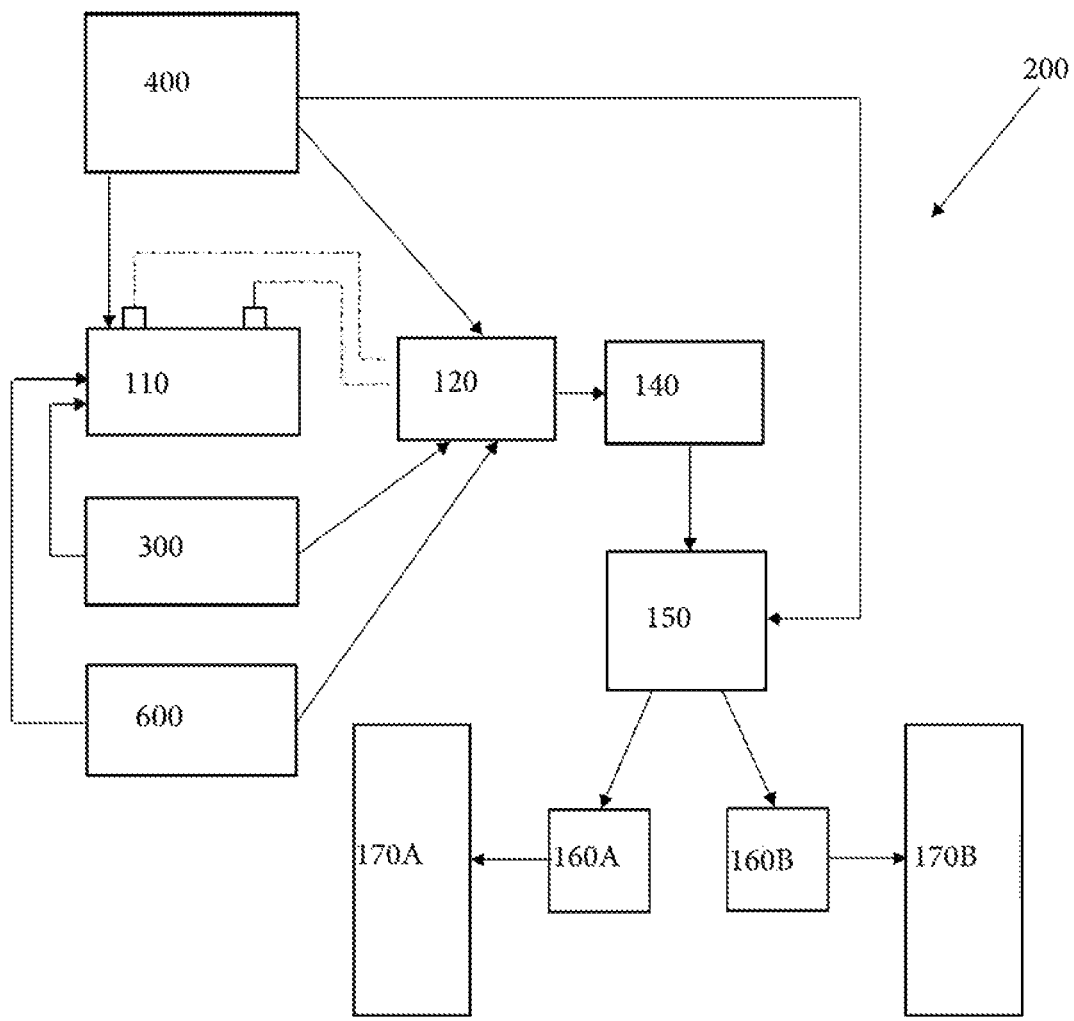
FIG. 3 is a schematic view of a version of the system of the present invention detailing the use of an optional hydrogen fuel cell and auxiliary power unit as a source of power.

Referring to FIG. 3, an alternative electric hydraulic motor system 200 is illustrated. In the version 200, an alternative power sources may be utilized, during the taxiing and takeoff mode, in place of or in conjunction with the battery 110. As shown in FIG. 3, the electric hydraulic motor system 200 may further comprise the use of a hydrogen fuel cell 300 and/or auxiliary power unit 400 which are operatively connected to the electric motor 120.

The hydrogen fuel cell 300 combines hydrogen and oxygen to produce electricity which drives or assists in driving the electric motor 120 of the electric hydraulic motor system 200 during the taxiing and takeoff mode. The electric motor 120 drives the hydraulic pump 140 which creates hydraulic pressure within the hydraulic system 150, which actuates the first hydraulic motors 160A and 160B in order to drive the corresponding wheels 170A and 170B of the aircraft.

In other versions of the invention suited for heavy aircraft, an auxiliary power unit 400 can be utilized by itself or in combination with the battery 110 and/or hydrogen fuel cell 300 in order to provide additional electricity to the electric hydraulic motor system 200 while in the takeoff and landing mode. Thus, during take-off, the system 200 in combination with the auxiliary power unit 400 combine to move the aircraft forward.

Moreover, the auxiliary power unit 400 can be operatively connected to and configured to charge the aircraft battery 110 as shown in FIG. 3. Additionally, the auxiliary power unit 400 may be operatively configured to directly provide hydraulic pressure to the hydraulic system 150 of the aircraft as shown in FIG. 3. Thus, while in taxiing and takeoff mode, the auxiliary power unit 400 of the aircraft provides additional hydraulic pressure to the hydraulic system 150, which imparts hydraulic pressure to actuate the first hydraulic motors 160A and 160B in order to drive the wheels 170A and 170B of the aircraft without the assistance of aircraft engine power. Thereby, bypassing the need to provide electricity to the electric motor 120 and first hydraulic pump 140.

Figure 4:
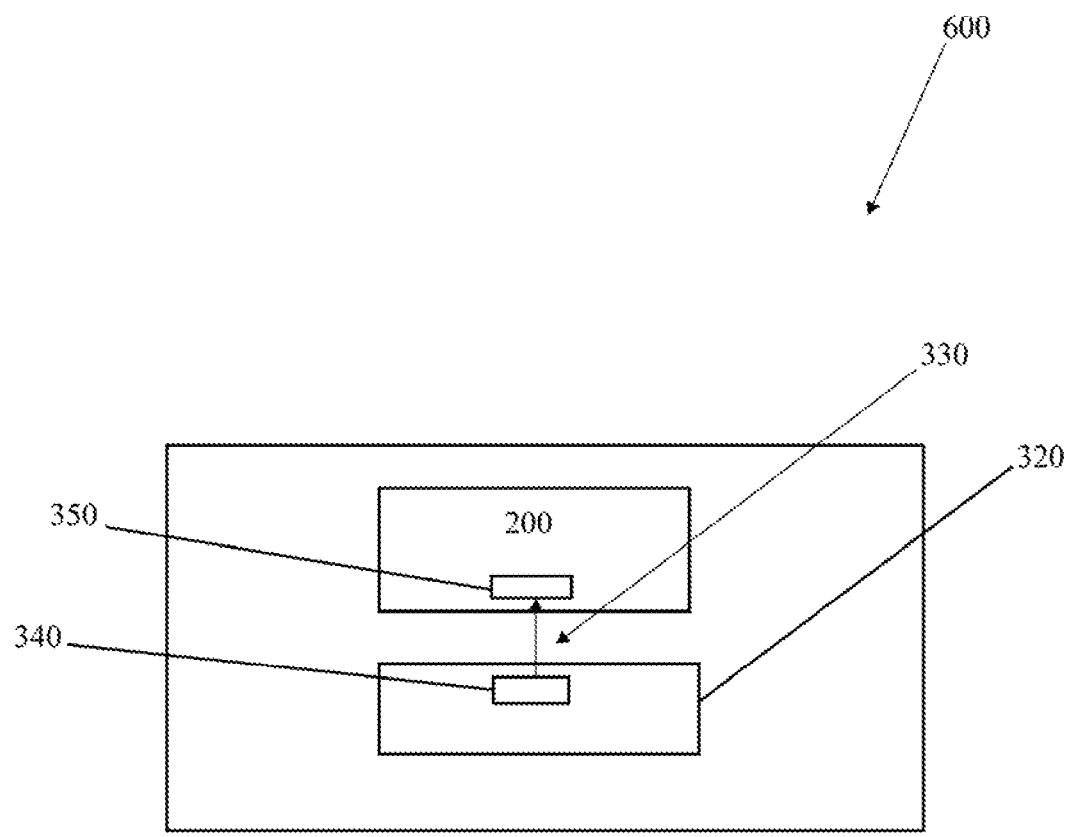
FIG. 4 is a schematic view of a version of the system of the present invention detailing the use of a wireless power transfer system as a source of power.

In yet another optional version as illustrated by FIG. 3 and FIG. 4, a wireless power transfer system 600 may be utilized by itself or in combination with the other aforementioned power sources in order to provide electric power to the electric hydraulic motor system 200. Ideally, the wireless transfer system 600 can be operably connected to and configured to charge the aircraft battery 110. The wireless power transfer system 600 can be any system which is configured to transfer electrical power from an external power source 320 apart from the aircraft to the electric hydraulic motor system 200 or battery 110 without the use of a direct wired connection. For example, and referring to FIG. 4, an Inductive Power Transfer ("IPT") may be utilized to create a wireless connection between the aircraft electrical hydraulic motor system 200 and an external power source 320. IPT is the transfer of power via a resonant inductive electromagnetic power transfer across an air gap 330. IPT is based on a changing magnetic field produced by alternating currents in a primary coil 340, inducing a voltage and current in a secondary coil 350 across the air gap 330. The primary coil 340 may be embedded in a taxiway, runway, or other surface which aircraft travel over or are statically positioned.

In particular, the principle of IPT occurs when a power supply produces an alternating electric current in the primary coil 340 which is embedded in the taxi way, which, in turn, produces a time-changing magnetic field. This variable magnetic field induces an electric current (producing a magnetic field) in the secondary coil 350, ideally positioned near the undercarriage of an aircraft. The induced AC and voltage are then rectified to Direct Current (DC) (in an inverter) to recharge the battery 110. Thus, the aircraft electrical hydraulic motor system 200 battery 110 may be charged during taxi and takeoff mode and while statically positioned. Ideally, the wireless power transfer system 600 is configured so that the aircraft battery 110 is continuously being charged throughout taxiing, landing, takeoff, and parking.

Alternatively, other sources of power, particularly clean energy solutions may be utilized, such as a solar array operably connected to the aircraft electric hydraulic system 200 or battery 110 in order to provide an additional source of power.

The electrical hydraulic motor system has may advantages and benefits. The system harnesses the clean, kinetic energy of the aircraft—having zero emissions—in order to charge the aircraft battery and provide hydraulic pressure to the hydraulic system. Thus, throughout taxiing, the aircraft does not require the use of the aircrafts engines. Thus, mitigating noise and environmental pollution while saving fuel, time and maintenance costs.

The previously described versions of the present invention have many advantages, including providing a system that is economical, reduces the need for fossil fuels and lowers emissions and noise pollution.

The disclosures of the following U.S. Patents are incorporated in their entirety by reference herein: U.S. Pat. Nos. 5,311,973; 4,007,817; 5,839,554; 9,351,359; 5,415,603; 7,237,634; 6,644,427; 8,079,437; 4,593,779; 6,330,498; 8,118,253; 8,016,228; and 4,759,178.

Although preferred versions of the invention have been described in considerable detail, other versions of the invention are possible.

All the features disclosed in this specification (including and accompanying claims, abstract, and drawings) may be replaced by alternative features serving the same, equivalent or similar purpose unless expressly stated otherwise. Thus, unless stated otherwise, each feature disclosed is one example only of a generic series of equivalent or similar features.

The invention claimed is:

1. An electric hydraulic motor system for aircraft having wheels, comprising:
   (a) a battery;
   (a) a wireless power transfer system for charging the battery;
   (b) an electric motor and an electric generator, both the electric motor and the electric generator are operatively connected to the battery of the aircraft;
   (c) a hydraulic system of the aircraft;
   (d) a first hydraulic pump operatively connected to each the electric motor and the hydraulic system of the aircraft;
   (e) a first hydraulic motor operatively connected to each wheel of the aircraft and the hydraulic system of the aircraft;
   (f) a second hydraulic motor operatively connected to each the electric generator and the hydraulic system of the aircraft; and
   (g) a second hydraulic pump operatively connected to each wheel of the aircraft, and the hydraulic system of the aircraft;
   wherein while in taxiing and takeoff mode, the battery of the aircraft provides electricity to drive the electric motor, which drives the hydraulic pump, which creates hydraulic pressure within the hydraulic system to actuate the first hydraulic motor in order to drive the wheels of the aircraft; and
   wherein while in braking mode, the rotation of the wheels of the aircraft drive the second hydraulic pump, which creates hydraulic pressure to drive the second hydraulic motor, which drives the electric generator which simultaneously slows the aircraft and charges the battery.

* * * * *